US008510268B1

(12) United States Patent
LaForge et al.

(10) Patent No.: US 8,510,268 B1
(45) Date of Patent: Aug. 13, 2013

(54) EDITABLE GEOGRAPHIC DATA FOR MAPS, AND APPLICATIONS THEREOF

(75) Inventors: Seth LaForge, Mountain View, CA (US); Kenson Yee, Mountain View, CA (US); David Eustis, New York, NY (US); James Norris, Mountain View, CA (US); Ramesh Balakrishnan, San Francisco, CA (US); Guoqiang Pan, Mountain View, CA (US); Adam Smith, San Francisco, CA (US); David S. Young, San Francisco, CA (US)

(73) Assignee: Google Inc., Mountain View, CA (US)

( * ) Notice: Subject to any disclaimer, the term of this patent is extended or adjusted under 35 U.S.C. 154(b) by 594 days.

(21) Appl. No.: 12/270,580

(22) Filed: Nov. 13, 2008

Related U.S. Application Data (60) Provisional application No. 60/996,358, filed on Nov. 13, 2007.

(51) Int. Cl.
*G06F 17/00* (2006.01)
(52) U.S. Cl.
USPC ........... 707/625; 707/661; 707/690; 709/203; 705/344; 726/4
(58) Field of Classification Search
USPC ................. 707/625, 661, 690, 707, 724, 918, 707/999.001; 701/200; 709/203; 705/344; 726/4
See application file for complete search history.

(56) References Cited

U.S. PATENT DOCUMENTS

| | | | |
|---|---|---|---|
| 6,216,130 B1 | 4/2001 | Hougaard et al. | |
| 7,107,285 B2 * | 9/2006 | von Kaenel et al. | 1/1 |
| 7,177,623 B2 | 2/2007 | Baldwin | |
| 7,373,385 B2 | 5/2008 | Prakash | |
| 7,827,120 B1 * | 11/2010 | Evans et al. | 705/344 |
| 2002/0049738 A1 * | 4/2002 | Epstein | 707/1 |
| 2002/0091758 A1 * | 7/2002 | Singh et al. | 709/203 |
| 2004/0001114 A1 | 1/2004 | Fuchs et al. | |
| 2004/0030706 A1 * | 2/2004 | Evans | 707/100 |
| 2005/0049784 A1 * | 3/2005 | Ikeuchi et al. | 701/208 |
| 2005/0114354 A1 | 5/2005 | Singh et al. | |
| 2005/0203768 A1 * | 9/2005 | Florance et al. | 705/1 |
| 2006/0036748 A1 * | 2/2006 | Nusbaum et al. | 709/228 |
| 2006/0129926 A1 * | 6/2006 | Malek et al. | 715/530 |
| 2006/0218201 A1 * | 9/2006 | Hsu et al. | 707/200 |
| 2006/0235897 A1 * | 10/2006 | O'Hara | 707/200 |
| 2007/0136383 A1 * | 6/2007 | Steinbach et al. | 707/200 |

(Continued)

OTHER PUBLICATIONS

"Google Earth Community: FAQ (Frequently Asked Questions)," Downloaded from http://bbs.keyhole.com/ubb/faq.php?Cat=0 on Jul. 1, 2008; 6 Pages.

(Continued)

*Primary Examiner* — Dennis Truong
(74) *Attorney, Agent, or Firm* — Sterne, Kessler, Goldstein & Fox PLLC (57) ABSTRACT

The present invention relates to a geographic information system having editable maps. In an embodiment, a system provides editable maps. The system includes an edit layer dataset that stores geocoded data. At least a portion of the edit layer dataset is edited by a user. The system also includes a base layer dataset that includes trusted geocoded data and a moderation module that receives a change in the edit layer dataset. The moderation module determines whether the change is reliable and promotes the change in the edit layer dataset to the base layer dataset if the change is reliable.

15 Claims, 12 Drawing Sheets

(56) References Cited

U.S. PATENT DOCUMENTS

| | | | |
|---|---|---|---|
| 2007/0294339 A1* | 12/2007 | Ala-Kleemola et al. | 709/203 |
| 2008/0140718 A1* | 6/2008 | Evans et al. | 707/104.1 |
| 2008/0189768 A1* | 8/2008 | Callahan et al. | 726/4 |
| 2008/0255758 A1* | 10/2008 | Graham et al. | 701/209 |
| 2008/0256041 A1* | 10/2008 | Allen et al. | 707/3 |
| 2009/0024315 A1 | 1/2009 | Scheibe | |

OTHER PUBLICATIONS

"Wikipedia:About," *Wikipedia*, Downloaded on Feb. 13, 2009 from http://en.wikipedia.org/w/index.php?title=Wikipedia:About &oldid—250056326; Published on Nov. 6, 2008; 12 Pages.

"Local," *Yahoo! Inc.*, Downloaded from http://help.yahoo.com/l/us/yahoo/local on Jul. 1, 2008; 1 Page.

"Yahoo! Local Tips and Tricks—Local," *Yahoo! Inc.*, Downloaded from http://help.yahoo.com/l/us/yahoo/local/help/basics/local-13.html on Jul. 1, 2008; 2 Pages.

"How Does the Rating System Work?—Local," *Yahoo! Inc.*, Downloaded from http://help.yahoo.com/l/us/yahoo/local/ratings/local-18.html on Jul. 1, 2008; 1 Page.

"Tag Maps," *Yahoo! Inc.*, Downloaded from http://tagmaps.research.yahoo.com on Jul. 1, 2008; 4 Pages.

"FAQ—TellMe Where," *Wikipedia*, Downloaded from http://wiki.tellmewhere.com/index.php?title=FAQ on Jul. 1, 2008; 4 Pages.

"Map Making Overview—OpenStreetMap," *Wikipedia*, Downloaded from http://wiki.openstreetmap.org/index.php/Map_Making_Overview on Jul. 1, 2008; 3 Pages.

"About GeoNames," Downloaded from http://www.geonames.org/about.html on Jul. 1, 2008; 4 Pages.

"Tracks4Africa—Mapping Africa, One Day at a Time," *TRACKS4AFRICA Ltd*, Downloaded from http://tracks4africa.com on Jul. 1, 2008; 2 Pages.

"Mapygon.com—hic sunt polygona," Downloaded from http://www.mapygon.com on Jul. 1, 2008; 1 Page.

"Maplandia.com—Frequently Asked Questions," MAPLANDIA.COM, downloaded from http://www.maplandia.com/faq on Jul. 1, 2008; 2 Pages.

"Maplandia.com—Google Maps World Gazetteer," MAPLANDIA.COM, Downloaded from http://wwwmaplandia.com on Jul. 1, 2008; 3 Pages.

Gennady Andrienko et al., "GIS for Everyone: the CommonGIS project and beyond" in Maps and the Internet (2003); available at http://geoanalytics.net/and/papers/mapsinternet03.pdf.

"History of OpenStreetMap," downloaded from http://wiki.openstreetmap.org/wiki/History_of_OpenStreetMap on Nov. 5, 2012; 2 pages.

\* cited by examiner

Business full edit davefromdesign@gmail.com | Saved Locations | Help | Search History | My Account | Sign out Web   Images   Video   News   Maps   more >>

Google Maps  [                                                              ]  [Search Map]

[Search the map]  [Find businesses]  Get directions

Editing– "Kapp's Pizza Bar & Grill"

Name
[John's Pizza] ~1002
Is this your business? Contact us

Categories
☒ Pizza (Restaurant)
☒ Italian (Restaurant)
☒ Bars, Pubs & Taverns (Restaurant)
[Add Category ▼] ~1004

Address
[191 Castro St
Mountain View, CA 94041] ~1006

Phone ☒
[(603) 961-1491] ~1010

Website ☒
[http://www.paulspizza.com] ~1012

Wheelchair access ☒
⊙ Yes  ○ No  ~1014

Hours
| Mon: | 9:00am– 7:00pm edit | ☐ Closed |
| Tue: | 9:00am– 9:00pm edit | ☐ Closed |
| Wed: | 9:00am– 7:00pm edit | ☐ Closed |
| Thu: | 9:00am– 9:00pm edit | ☐ Closed |
| Fri: | 9:00am– 4:00pm edit | ☐ Closed |
|      | 6:00am–11:00pm      |          |
| Sat: |                     | ☑ Closed |
| Sun: |                     | ☑ Closed |

1016

Placement of marker

[Map] [Satellite] [Hybrid]

Please drag the marker to its correct place.

Description
[                                    ]
                    1018

Ambiance ☒                Dress code ☒  1024
☑ Romantic                    ☑ Casual  ~1020
☐ Elegant/Upscale             ☐ Business Casual
☐ Trendy/Hip                  ☐ Formal (jacket required)
☐ Rustic                      Parking ☒
☐ Casual                      ☑ Street
☐ Quiet                       ☐ Private lot
☑ Loud                        ☐ Validated ~1026
☑ Live music                  ☐ Garage
☐ Historical                  ☐ Valet

[Add Attribute           ▼] ~1022

[Save]  [Cancel]

EDITABLE GEOGRAPHIC DATA FOR MAPS, AND APPLICATIONS THEREOF

This application claims the benefit of U.S. Provisional Appl. No. 60/996,358, filed Nov. 13, 2007, and incorporated by reference herein in its entirety.

FIELD OF THE INVENTION

The present invention generally relates to geographic information systems.

BACKGROUND

Geographic information systems are computer systems that provide the ability to store and to display spatial data. Geographic information systems, such as the Google Maps service, include data geocoded to locations on a map. The geocoded data may include addresses, points of interest and businesses. Many geographic information systems, such as mapping services, are connected to the Internet and are available to users through web browsers or other clients. However, much geographic data is still unavailable on these geographic information systems. Further, some of the data is inaccurate. For example, many addresses are geocoded to incorrect locations.

The Internet provides an opportunity to enlist the help of users to improve the quality and quantity of available geographic data. Users can create content, share that content, and allow others to improve on that content. In at least one case, this has allowed users to collaborate to create an online encyclopedia (www.wikipedia.com). However, allowing users to create their own content, or modify that of others, can lead to vandalism or unwanted advertising, known as spam. Further, allowing users to edit the geographic data could reduce the quality of the data if the users enter incorrect information.

Systems and methods are needed that allow users to edit geographic information in a geographic information and maintain the quality of the geographic information.

BRIEF SUMMARY

The present invention relates to a geographic information system having editable maps. In an embodiment, a system provides editable maps. The system includes an edit layer dataset that stores geocoded data. At least a portion of the edit layer dataset is edited by a user. The system also includes a base layer dataset that includes trusted geocoded data and a moderation module that receives a change in the edit layer dataset. The moderation module determines whether the change is reliable and promotes the change in the edit layer dataset to the base layer dataset if the change is reliable.

In another embodiment, a computer-implemented method provides editable maps. The method includes the steps of: receiving a change to geocoded data in an edit layer dataset; determining whether the change is reliable; and promoting the change to a base layer dataset if the change is reliable. The base layer dataset stores trusted geocoded data.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the present invention and to enable a person skilled in the pertinent art to make and use the present invention.

The present invention is described with reference to the accompanying drawings. The drawing in which an element first appears is typically indicated by the leftmost digit or digits in the corresponding reference number.

DETAILED DESCRIPTION OF EMBODIMENTS

The present invention provides a geographic information system having editable maps, and applications thereof. In the detailed description of the present invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As described herein, embodiments of the present invention enable users to add geocoded data to maps, while maintaining the quality of the geocoded data. The term "geocoded data", as the term is used herein, includes any map feature that has an associated geographic location. Example geocoded data includes addresses, businesses, and points of interest. While the present invention is described herein with reference to illustrative embodiments for particular applications, it should be understood that the invention is not limited thereto. Individuals skilled in the relevant art(s) with access to the teachings provided herein will recognize additional modifications, applications, and embodiments within the scope thereof and additional fields in which the invention would be of significant utility.

This Detailed Description is divided into sections. The first section describes example system embodiments for enabling users to change geocoded data and for moderating the changes, according to embodiments of the present invention. The second section describes example method embodiments for enabling users to change geocoded data and for moderating the changes, according to embodiments of the present invention. Finally, the third section describes example user interfaces, which may be used by a geographic information system according to an embodiment of the present invention.

Example System Embodiments

Figure 1:
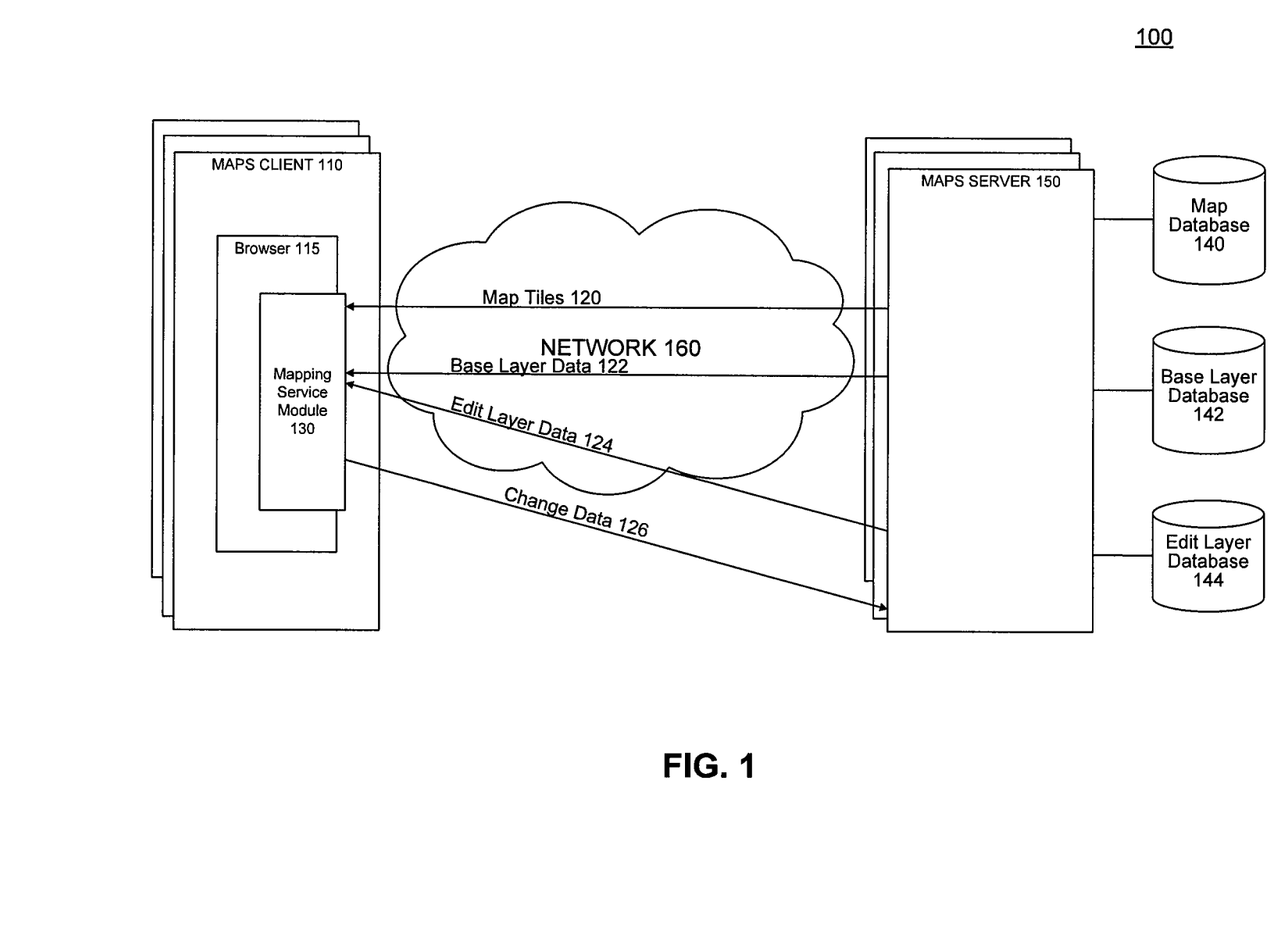
FIG. 1 is a diagram illustrating a web mapping system according to an embodiment of the present invention.

FIG. 1 is a diagram illustrating system 100 according to an embodiment of the present invention. System 100 includes a maps client 110. Client 110 communicates with one or more maps servers 150, for example, across one or more networks 160, such as the Internet or a local area network. Server(s) 150 may serve map tiles 120, base layer data 122, and/or edit layer data 124 to client 110.

Client 110 includes a mapping service module 130. Mapping service module 130 displays a visual representation of a map, e.g., as a viewport into a grid of map tiles. Mapping system module 130 is implemented using a combination of markup and scripting elements, e.g., using HTML and JavaScript. In an embodiment, mapping service module 130 may be downloaded and rendered or executed by a browser 115. As the viewport is moved, mapping service module 130 requests additional map tiles 120 from server(s) 150, assuming the requested map tiles have not already been cached in local cache memory.

Mapping service module 130 may have two modes and may display geocoded data in two modes such as, for example, a browse mode and a search mode. In search mode, mapping service module 130 may display search results for geocoded data in a particular area. In browse mode, mapping service module 130 may display all the geocoded data corresponding to a particular area.

In an embodiment, mapping service module 130 displays geocoded data that may represent things such as, for example, geocoded address locations, businesses, and points of interest. This geocoded data may be stored as base layer data and edit layer data. The base layer data includes reasonably accurate geocoded data. The edit layer data includes less accurate geocoded data or geocoded data, the accuracy of which has not yet been evaluated. The edit layer data may include recent user changes that have not yet been moderated. This is described in more detail below.

Mapping service module 130 may receive base layer data 122 and edit layer data 124 from server 150. Base layer data 122 and edit layer data 124 may represent the base layer and the edit layer, respectively. In an illustrative example, base layer data 122 and edit layer data 124 may be encoded in Extensible Markup Language (XML).

The base layer may be always rendered on the map, displayed in search results and used for generating driving directions, etc. Mapping service module 130 may use the edit layer data more selectively. Additionally, mapping service module 130 may enable the user to hide the edit layer altogether.

Mapping service module 130 may use distinctive styling to distinguish between the two layers. The edit layer may be displayed with distinctive styling to indicate pending changes such as, for example, data additions, changes, moves, and deletions. For example, a base layer feature that has been deleted in the edit layer might show up grayed out and translucent, and a base layer feature that has been moved in the edit layer might show up grayed out in the original location with styling to indicate its change in the new location.

Mapping service module 130 may have an editing mode. In editing mode, mapping service module 130 enables users to add additional geocoded data and to edit existing features. Mapping service module 130 may have several edit interfaces, including a quick edit interface and a full edit interface. The full edit interface enables the user to enter more information about a feature than the quick edit interface. Once the user enters information to change a feature, mapping service module 130 sends the information to maps server 150 in the form of change data 126. Change data 126 may contain information, for example, to add, to edit, to delete, or to move a feature. Change data 126 may be, for example, an HTTP request with the information encoded in HTTP parameters.

Server(s) 150 are coupled to a map database 140, a base layer database 142, and an edit layer database 144. Map database 140 stores map tiles and/or data used to generate map tiles. Base layer database 142 stores geocoded data associated with a base layer. Edit layer database 144 stores geocoded data associated with an edit layer. This separation is illustrative. In practice, all the data may be contained in a single database or may be divided among databases as is known to those skilled in the art.

When server 150 receives change data 126 from client 110, server 150 stores the changes in the edit layer database. Those changes can be viewed by other clients by requesting edit layer data 124. In this way, user changes are reflected immediately in embodiments of the present invention without requiring intervention from a third party or moderator. However, for the changes in the edit layer database 144 to be propagated to the more reliable base layer database 142, a moderator may be required, as is described below. The segregation of more reliable data and less reliable or unevaluated data allows for users to contribute to developing a library of geocoded data, while maintaining a high level of quality.

Server 150 may geocode an address to a location by looking up known address locations and interpolating the location based on the known address locations. In an embodiment, to determine an address location, server 150 may look up a location of address range and may interpolate the location of intermediate addresses within the address range. For example, server 150 interpolate the location of the address "150 Main Street" to be at the center of the location of the 100-200 block of Main Street. Embodiments of this invention may enable users to improve the quantity and quality of the known address locations. Improving the quantity and quality of the known address locations may improve the accuracy of the interpolated address locations.

Each of map database 140, base layer database 142, and edit layer database 144 may be implemented on a relational database management system. Examples of relational databases include Oracle, Microsoft SQL Server, and MySQL. These examples are illustrative and are not intended to limit this invention.

Client 110 can be a general-purpose computer with a processor, local memory, a display, and one or more input devices such as a keyboard or a mouse. Alternatively, client 110 can be a specialized computing device such as, for example, a mobile handset, television, or set-top box. Server 150, similarly, can be implemented using any general-purpose computer capable of serving data to client 110.

Server 150 may include a web server. A web server is a software component that responds to a hypertext transfer protocol (HTTP) request with an HTTP reply. As illustrative examples, the web server may be, without limitation, an Apache HTTP Server, an Apache Tomcat, a Microsoft Internet Information Server, a JBoss Application Server, a WebLogic Application Server, or a Sun Java System Web Server. The web server may serve content such as hypertext markup language (HTML), extendable markup language (XML), documents, videos, images, multimedia features, or any combination thereof. This example is strictly illustrative and does not limit the present invention.

Network(s) 160 can be any network or combination of networks that can carry data communication and may be referred to herein as a computer network. Such network(s) 160 can include, but are not limited to, local area network(s), medium area network(s), and/or wide area network(s) such as the Internet. Network(s) 160 can support protocols and technology including, but not limited to, World Wide Web protocols and/or services. Intermediate web servers, gateways, or other servers may be provided between components of system 100 depending upon a particular application or environment.

Each of mapping service module 130, map editor 132, and browser 115 may be implemented in hardware, software, firmware, or any combination thereof.

Figure 2:
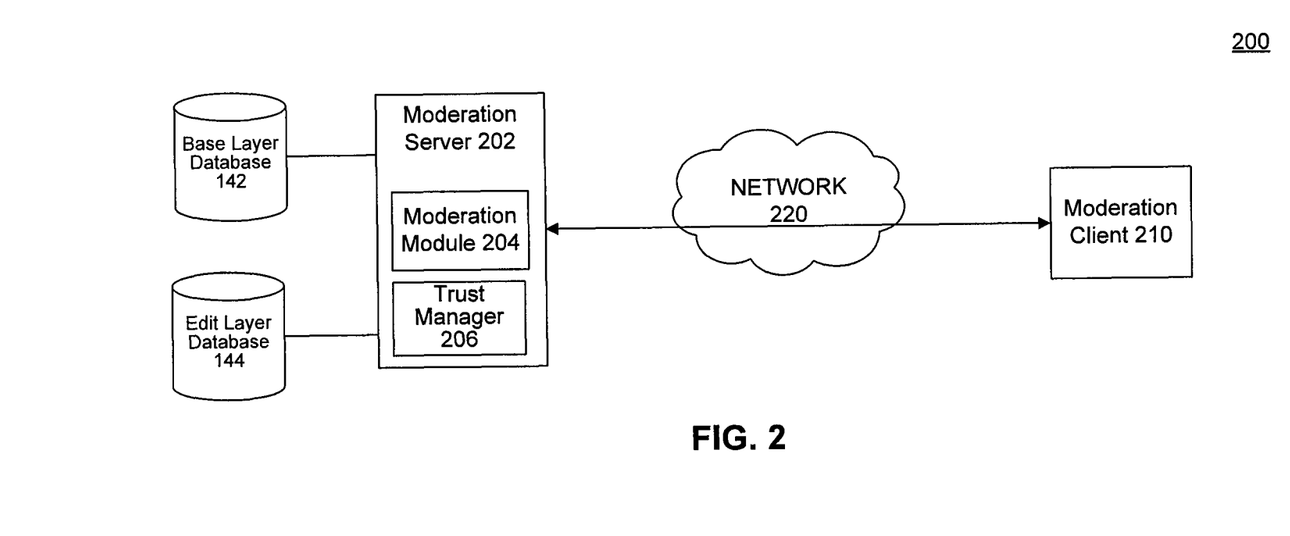
FIG. 2 is a diagram illustrating a system for moderating changes made using the geographic information system of FIG. 1 according to an embodiment of the present invention.

FIG. 2 is a diagram illustrating a system 200 for moderating changes made using system 100 according to an embodiment of the present invention. System 200 determines whether changes stored in edit layer database 144 are accurate enough to be promoted to base layer database 142. In examples, changes stored in the edit layer database 144 that may be promoted to base layer database 142 include operations to (1) add new geocoded data, (2) delete existing geocoded data, (3) move geocoded data, or (4) edit map geocoded data.

System 200 includes a moderation client 210 coupled to a moderation server 202 via a network 220. Moderation client 210 may include a web browser (not shown) that displays data from moderation server 202 to a user, known as a moderator, and sends input from a moderator to moderation server 202. The moderator may be a trained, compensated employee or may be a trusted user.

Moderation server 202 may include a trust manager 206 and a moderation module 204. Trust manager 206 may maintain automated trust metrics for users. Trust manager 206 may also maintain permissions of what level of trust is required for performing or endorsing various types of changes. In an embodiment, the trust metrics may be determined based on the number of changes promoted to the base layer or the number of changes rejected.

Moderation module 204 moves changes from the edit layer to the base layer. Moderation module 204 may send each change in edit layer database 144 to moderation client 210 to be displayed to a moderator. The moderator may have three options: accept the change, reject the change (which may actually consists of changing the feature back to its pre-change state), or leave the change to ripen for some period of time. In an embodiment, accepted changes are promoted to the base layer and are indexed and rendered. Changes that are left in the edit layer for a period of time (e.g., a week) to ripen may become automatically accepted and promoted, for example, if no user edits are made to the change during the ripening time period.

In an embodiment, moderation module 204 may evaluate a change before presenting it to the moderator. For example, when changes are nonsensical or when changes are drastic when compared to information already stored in base layer database 142, the moderation module 204 may remove the change or flag the change as suspect before presenting the change for review by the moderator.

Each of moderation module 204 and trust manager 206 may be implemented in hardware, software, firmware, or any combination thereof.

Example Method Embodiments

Figure 3:
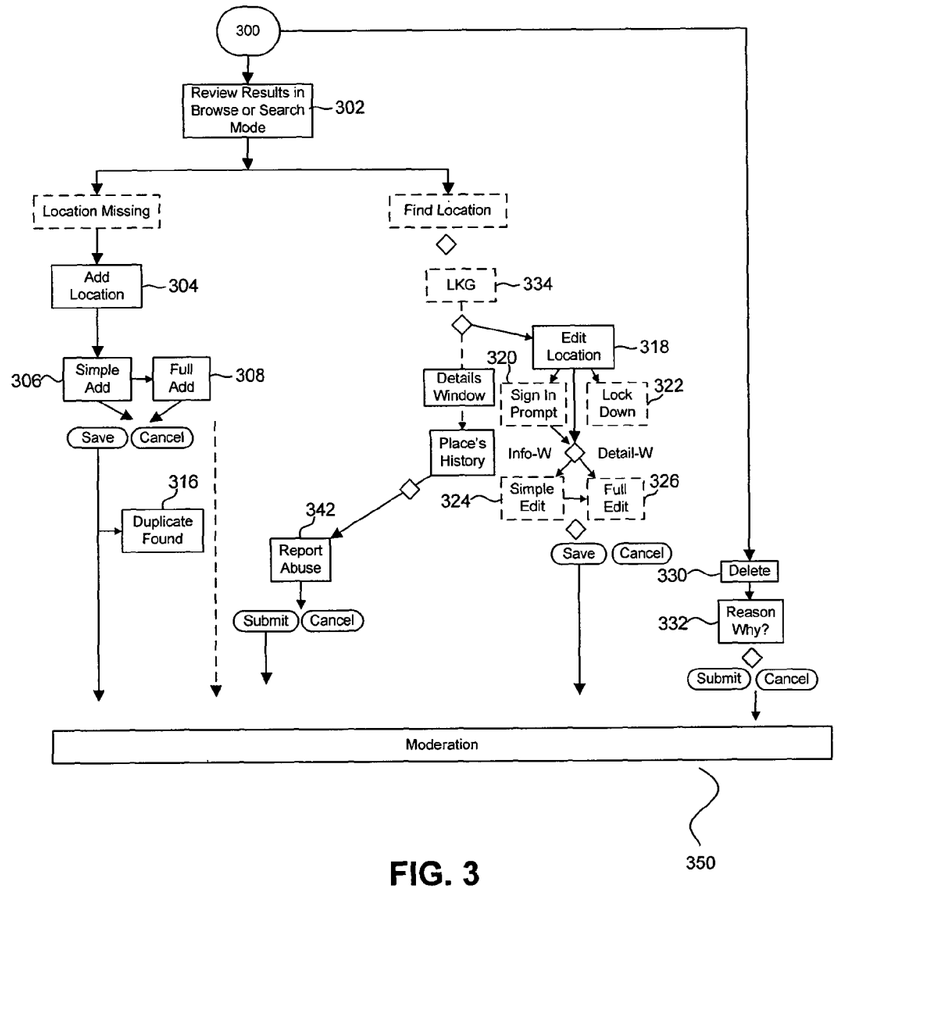
FIG. 3 is a flowchart illustrating a method for moderating user changes to map geocoded data and information according to an embodiment of the present invention.

FIG. 3 is a flowchart illustrating a method 300 for enabling users to change geocoded data according to an embodiment of the present invention. In an embodiment, method 300 may be used in operation of system 100 in FIG. 1.

Method 300 may display geocoded data in either browse or search mode (step 302). If a user is unable to find a feature displayed in browse or search mode, the user may add a feature (step 304). The user may add the feature using a quick edit interface (step 306) or using a full interface (step 308). Examples of a quick edit interface and a full interface are provided in FIGS. 9 and 10. If operating in search mode, there may be a check to determine if a duplicate of the feature already exists (step 316). This may be useful because in search mode only a subset of geocoded data in a particular area may be displayed. After an addition or change has been entered and saved, the addition or change is sent for moderation (step 350).

In an embodiment, method 300 enables a user to edit a feature (step 318). The feature may be located at the last known good edit ("LKG") (step 334). The last known good edit may be the version of the feature in the base layer rather than the edit layer. To edit the feature, a user may have to be authenticated (step 320). If the feature is locked down, the user may not be able to provide an edit (step 322). In an example, users may not be allowed to make edits on some types of geocoded data. For example, changes to the locations of hospitals and police stations may not be allowed. Alternatively, those types of geocoded data may simply be flagged for the moderator to take greater care before promoting the edit to the base layer. The user may make the edit with a quick edit interface (step 324) or a full interface (step 326). The edits available include modifying the title, description, location and other attributes of the feature. After the user has entered and saved the edit, the edit is sent for moderation (step 350).

In an embodiment, method 300 also enables a user to delete a feature (step 330). The user may be required to enter a reason why the feature should be deleted (step 332). After the user has submitted the deletion, the change is sent for moderation (step 350).

Thus, method 300 enables a user to make changes to the edit layer dataset. Changes to the edit layer dataset include additions (step 304), edits (step 318), and deletions (step 330).

Optionally, method 300 also may enable a user to report abuse (step 342). After the user has submitted the report, the report is sent for moderation (step 350). In response to the report, the moderator may revoke a user's editing privileges.

Figure 4:
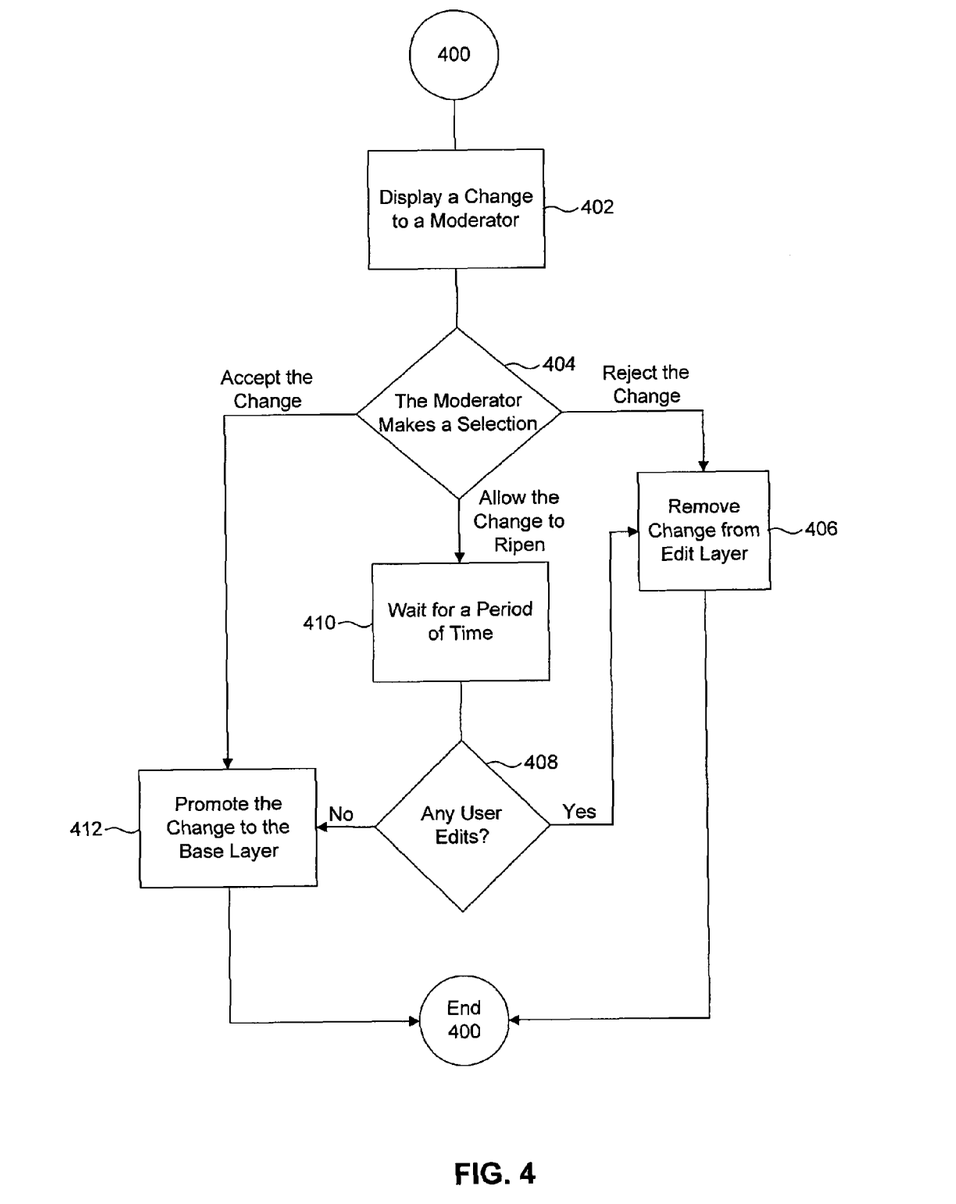
FIG. 4 is a flowchart illustrating a method for enabling users to change geocoded data and information according to an embodiment of the present invention.

FIG. 4 is a flowchart illustrating a method 400 for moderating a user change to a feature, according to an embodiment of the present invention. In an example, method 400 may be used in operation of system 200 (see FIG. 2).

Method 400 begins by displaying a change to a feature to a moderator (step 402). In an embodiment, the moderator may select one of three options (decision block 404). The three options are (1) to accept the change, (2) to reject the change, or (3) to allow the change to ripen. If the moderator accepts the change, the change is promoted to the base layer dataset (step 412). In other words, the change is incorporated into the trusted base layer dataset. In examples, if the change is a deletion of a feature, the feature is removed from the base layer dataset. If the change is an add, a feature is added to the base layer dataset. If the change is an edit or move of a feature, the feature is updated in the base layer dataset.

If the moderator rejects the change, the change in the edit layer reverts to state of the base layer (step 406). A change may be rejected because the change was incorrect or the product of vandalism. Rejecting a change may also affect a trust metric of the user who made the change.

If the moderator allows the change to ripen, a ripening period of time is allowed to pass (step 410). In an example, the period of time may be a week. During that period, users may edit the change (decision block 408). If no further user edits are made to the change in that time period, the change is promoted (step 412). Otherwise the change is removed from the edit layer (step 406).

Example User Interfaces

Figure 5:
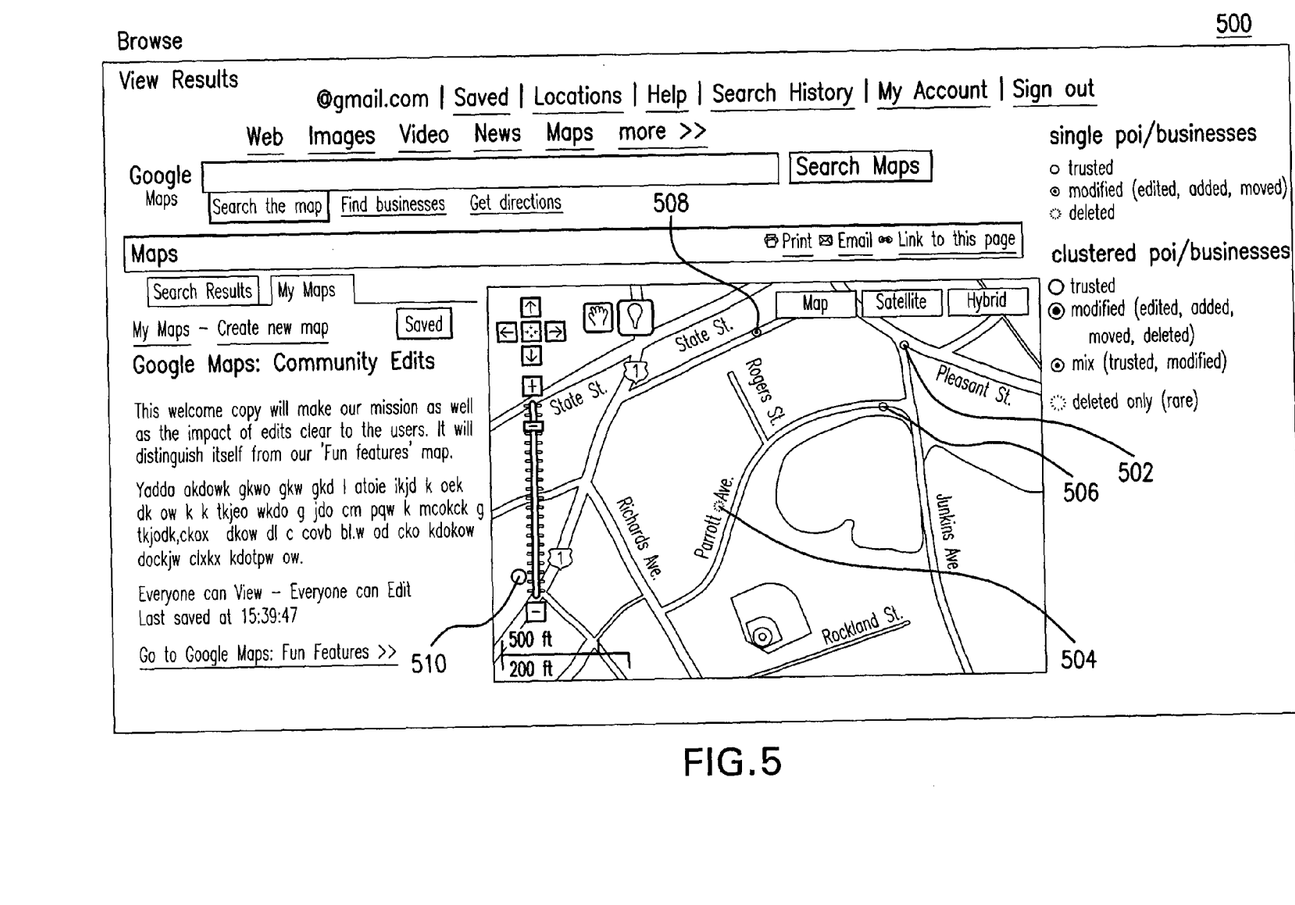
FIGS. 5-7 illustrate example user interfaces for searching and browsing geocoded data which may be used by the geographic information system of FIG. 1.
Figure 6:
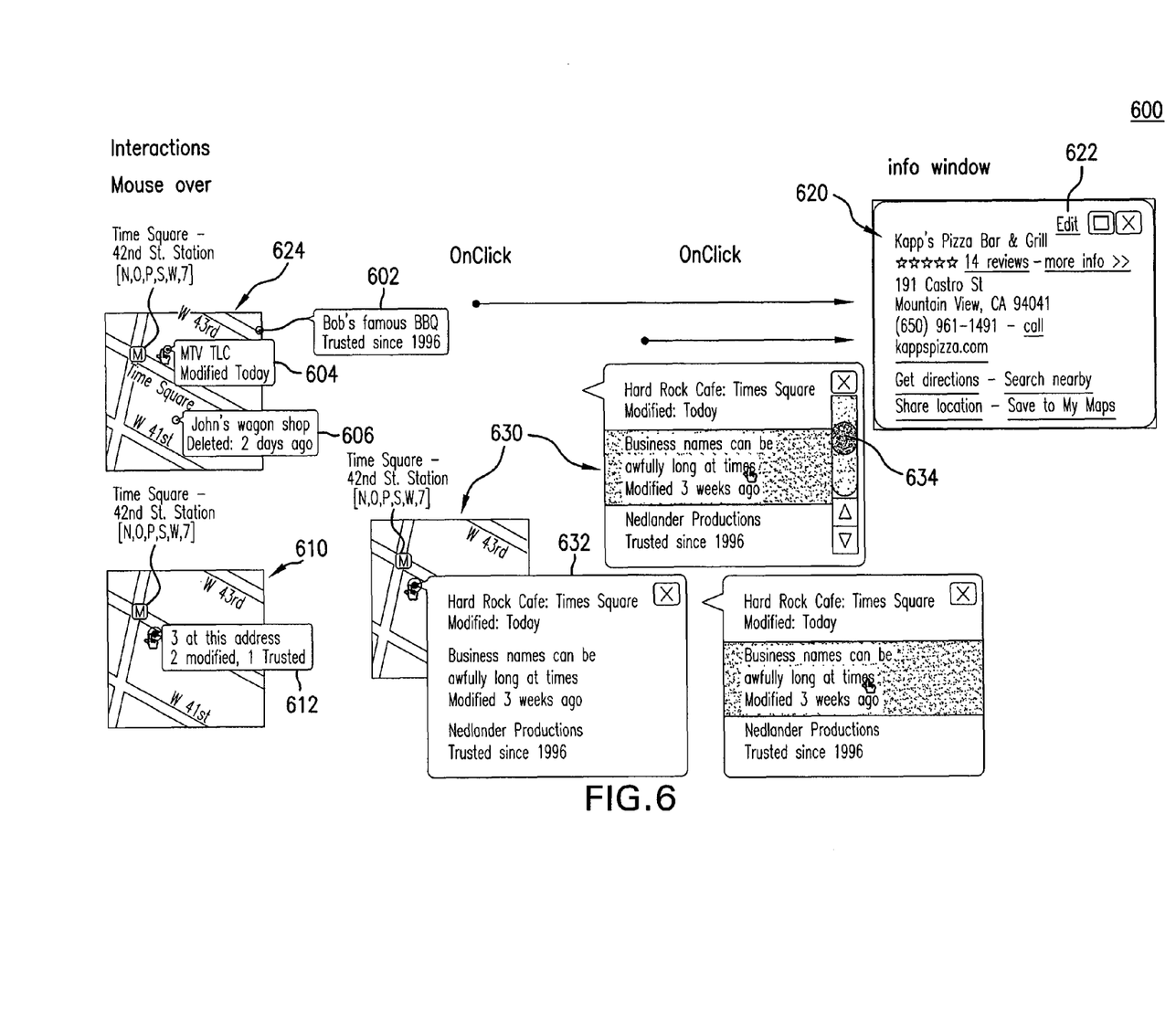
Figure 7:
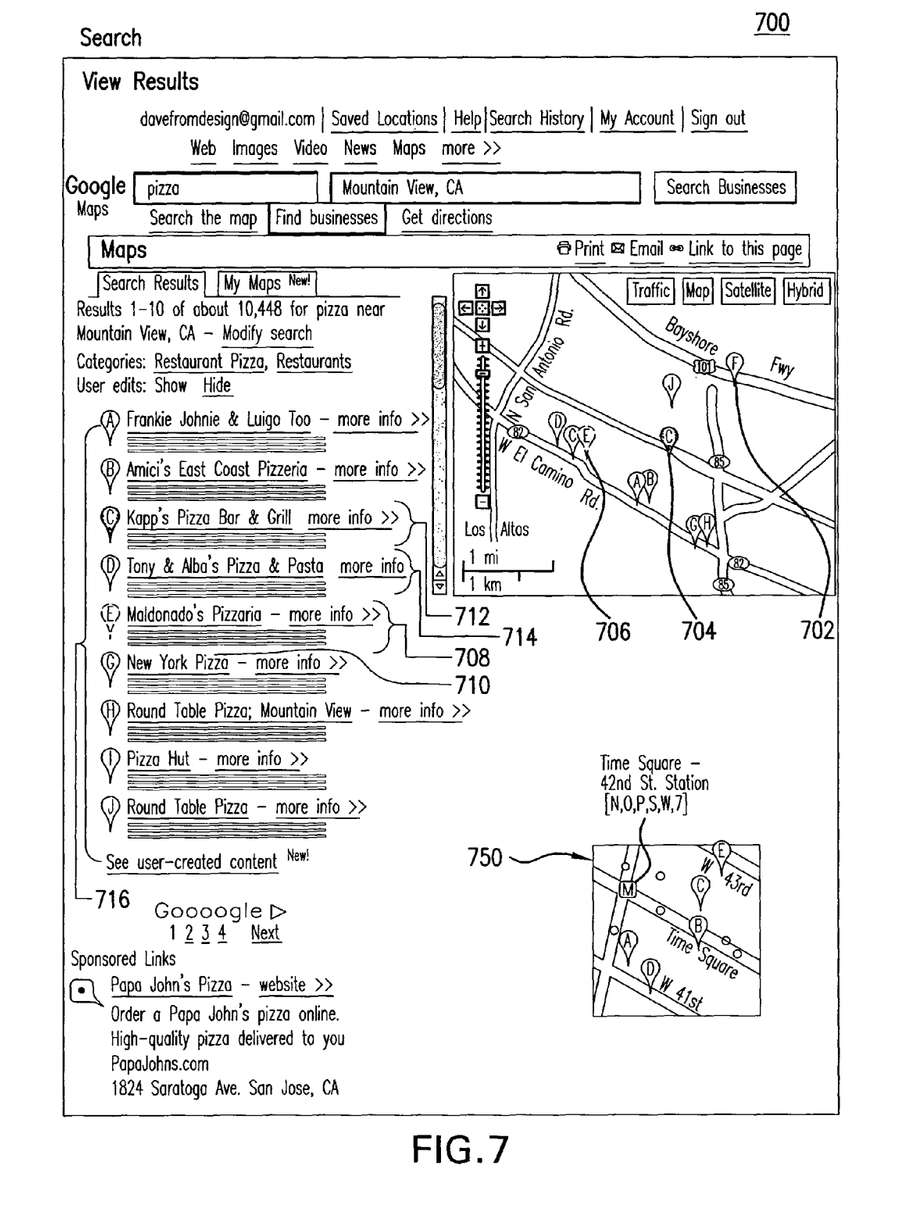

FIGS. 5-7 show example user interfaces for searching and browsing geocoded data. These example user interfaces may be used with system 100.

FIG. 5 shows an example user interface 500 displaying geocoded data in browsing mode. The browse mode illustrated in FIGS. 5 and 6 is optional. The base layer may be shown by trusted icons, such as an icon 502 and an icon 506. Some of the base layer may be shown by deleted icons which appear grayed-out and/or translucent, such as an icon 504. The edit layer may be shown by modified icons, such as an icon 508. When several features are close together, they may be represented by a single, larger, clustered icon, such as an icon 510.

FIG. 6 shows a diagram 600 illustrating example user interfaces demonstrating how a user may interact with example user interface 500 in FIG. 5. When the user mouses over an icon for a single feature, one of several alternative information boxes appear, as is shown in a screenshot 624. When the icon represents a feature in the base layer and the feature has not been moved or deleted, an information box 602 may appear. Information box 602 shows how long the feature has been trusted in the base layer. When the icon represents a feature in the base layer and the feature has been moved or deleted, an information box 606 may appear. Information box 606 shows how long ago the feature was deleted or moved. When the icon represents a feature from the edit layer, an information box 604 may appear. Information box 604 shows, for example, when a user submitted the change to the feature for moderation.

When a user clicks on any of the icons representing a single feature, an information window such as, for example, information window 620 appears. Information window 620 displays information about the feature such as, for example, name, address, URL, etc. In an embodiment, information window 620 also includes an edit link 622. When a user selects edit link 622, a quick editor is displayed, as is described below.

When a user mouses over a clustered icon representing multiple nearby features, an information box appears, as shown in user interface 610. User interface 610 shows an information box 612. The information box 612 shows the number of features represented by the clustered icon, along with the types of the features (e.g., modified, trusted, deleted, etc).

In an embodiment, when a user clicks on any of the clustered icons representing multiple nearby features, an information box such as, for example, information box 632 in an example user interface 630 appears. Information box 632 lists the features represented by the clustered icon. Clicking on a particular feature listing such as, for example, feature listing 634 displays an information window, such as information window 620.

FIG. 7 shows an example user interface 700 displaying geocoded data in search mode. Example user interface 700 shows a search for "pizza" in the vicinity of "Mountain View, Calif.". The search returns a result set 716. Each result has a corresponding pushpin icon. Pushpin icons may vary depending on the feature represented. A pushpin icon 702 represents a feature from the base layer. A pushpin icon 706 represents a feature from the base layer that has a delete change in the edit layer. Pushpin icon 706 is grayed-out and has a dotted outline. A pushpin icon 704 represents a feature from the base layer that has a change in the edit layer. Pushpin icon 704 is grayed-out.

Result set 716 includes a result 712 and a result 708. Result 712 represents a feature from the base layer that has a change in the edit layer. Result 712 indicates that it has been recently modified and provides a link 714. When selected, link 714 flags the result for review by a moderator. Result 708 represents a feature in the base layer in which a user requested deletion in the edit layer. Result 708 has a message 710 that indicates that it has been recently deleted and provides a link to a flag for review by a moderator at 710.

A user interface 750 shows an alternative embodiment combining aspects of both the search and browse mode. User interface 750 shows both search results represented by pushpin icons and circular icons representing geocoded data available in browse mode.

FIGS. 8A-C and 9-12 show example user interfaces for making user edits to geocoded data, which may be used in operation of system 100.

Figure 8A:
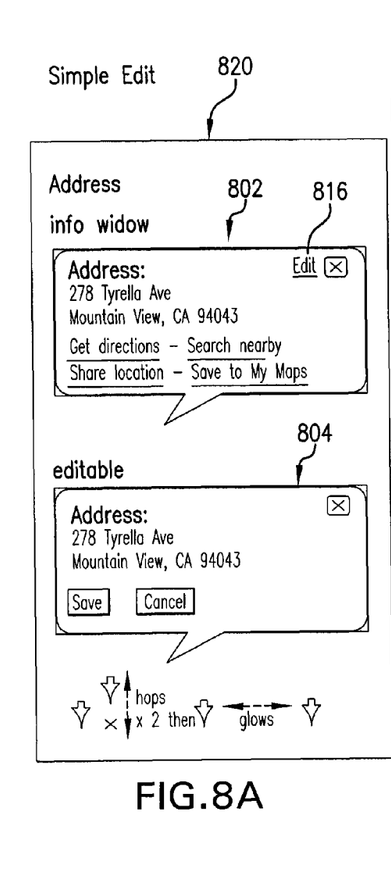
FIGS. 8A-C, 9-10, 11A-B and 12 illustrate example user interfaces for making changes to geocoded data, which may be used by the geographic information system of FIG. 1.
Figure 8B:
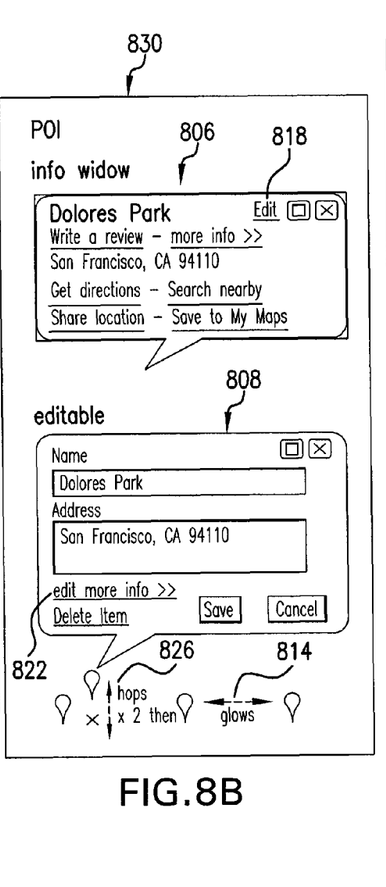
Figure 8C:
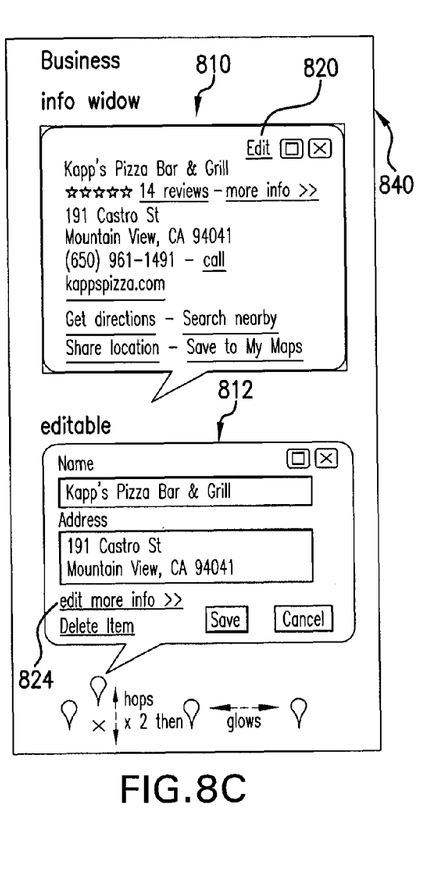

FIGS. 8A-C show information windows and quick edit interfaces for various types of geocoded data. For an address feature type, FIG. 8A shows a diagram 820. Diagram 820 shows an information window 802 with details of an address feature. When a user selects edit link 816, a quick edit interface 804 appears. The user can move the corresponding placemark. Moving the placemark results in a change to the geocode (latitude/longitude coordinates) of that address. As a result, a user can improve the accuracy of address geocodes. Further, when a geocode is updated, other nearby geocodes may be re-interpolated as well. For example, if a user adjusts the location of his address to match the location of his house on the map, then the locations of his neighbors' houses may be updated as well. However, these neighborhood updates may only occur if the change is within certain tolerance parameters. For example, addresses may only be re-interpolated if they are on the same block and in progression.

FIG. 8B shows a diagram 830 illustrating an information window and a quick edit interface for a point of interest (POI) feature. Diagram 830 includes an information window 806 showing details of a point of interest (POI) feature. When a user selects edit link 818, a simple edit interface 808 appears. The name and address field are editable in quick edit interface 808. The user can edit more fields from the full edit interface, as discussed below. The user can access the full edit interface from a link 822.

FIG. 8B shows a diagram 830 illustrating an information window and a quick edit interface for a business feature. Information window 810 shows details of a business feature. When a user selects edit link 820, a quick edit interface 812 appears. The name and address fields are editable in quick edit interface 812. The user can edit more fields from the full edit interface, as discussed below. The user can access the full edit interface from a link 824.

When quick edit interface 808 or 812 appears, the icon may hop twice (as shown at 826) and then glow (as shown at 814) to indicate that it can be moved.

Figure 9:
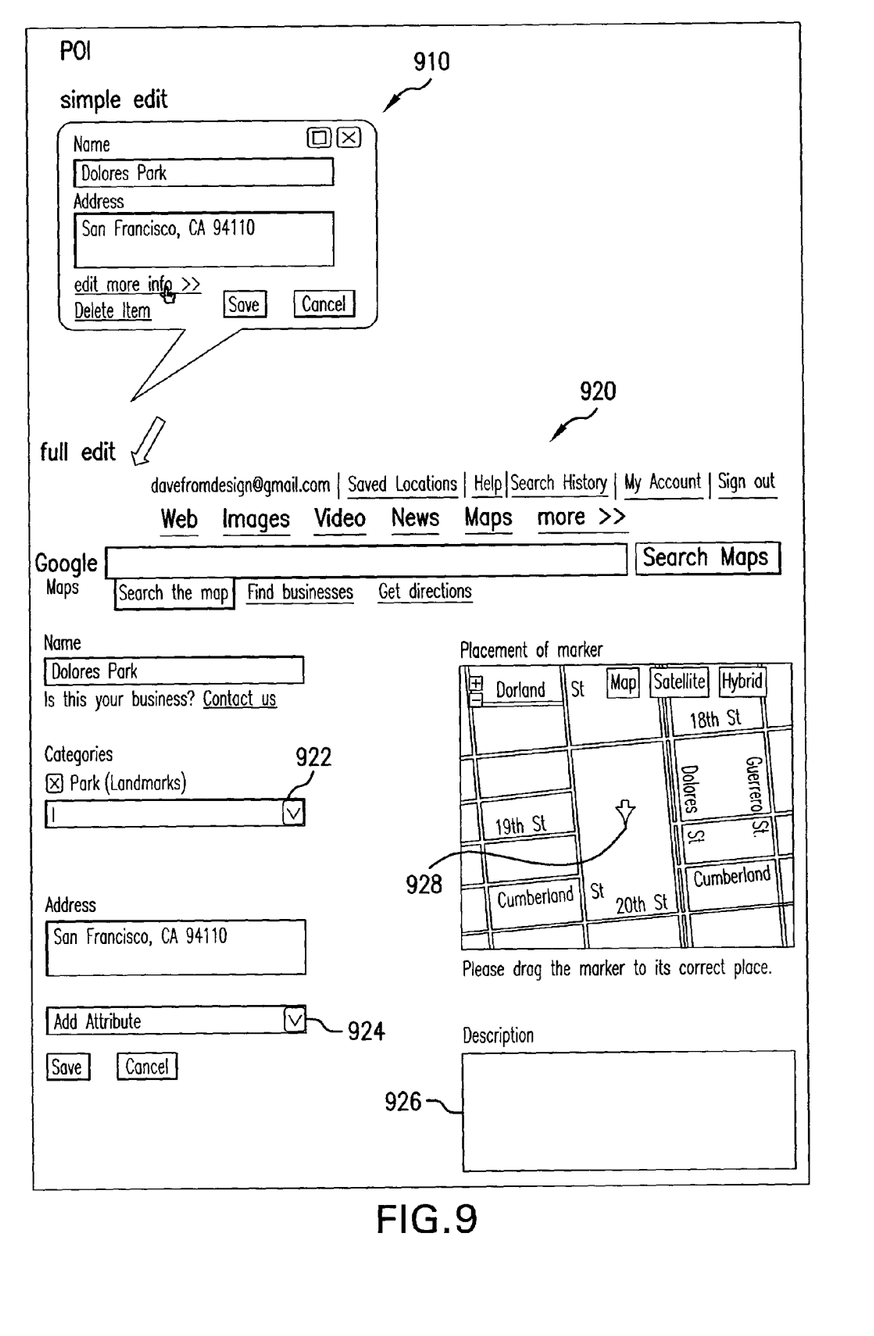

FIG. 9 shows a quick edit interface 910 and a full edit interface 920 for a point of interest (POI) feature. Quick edit interface 910 enables a user to change the name and the address of the POI feature. In addition to those fields, full edit interface 920 enables a user to enter a description in a text field 926, a category in a drop down menu 922, and an attribute in a drop down menu 924. A user can also reposition a marker 928 to relocate the feature.

As mentioned earlier, drop down menu 924 enables a user to add and edit attributes. An attribute may be a data field that includes some information about a geographic feature. An attribute may have an attribute name and data value and present an input to a user to modify that data value. For example, a feature representing a restaurant may have a "wheelchair access" attribute that indicates whether the restaurant is wheelchair accessible. Some attributes may be predefined. Examples of predefined attributes include "wheelchair access", "hours", "ambiance", "dress code", and "parking". Some predefined attributes may have a special behavior. For example, the "hours" attribute may present a specialized widget that enables a user to input the hours, as opposed to a mere text field.

The user also may create attributes. In creating the attribute, a user may enter any attribute name. If the attribute name is the same as one of the predefined attributes, the user may be presented with the specialized widget for that predefined attribute. Otherwise, a text field may be used to input a value for the attribute.

Figure 10:
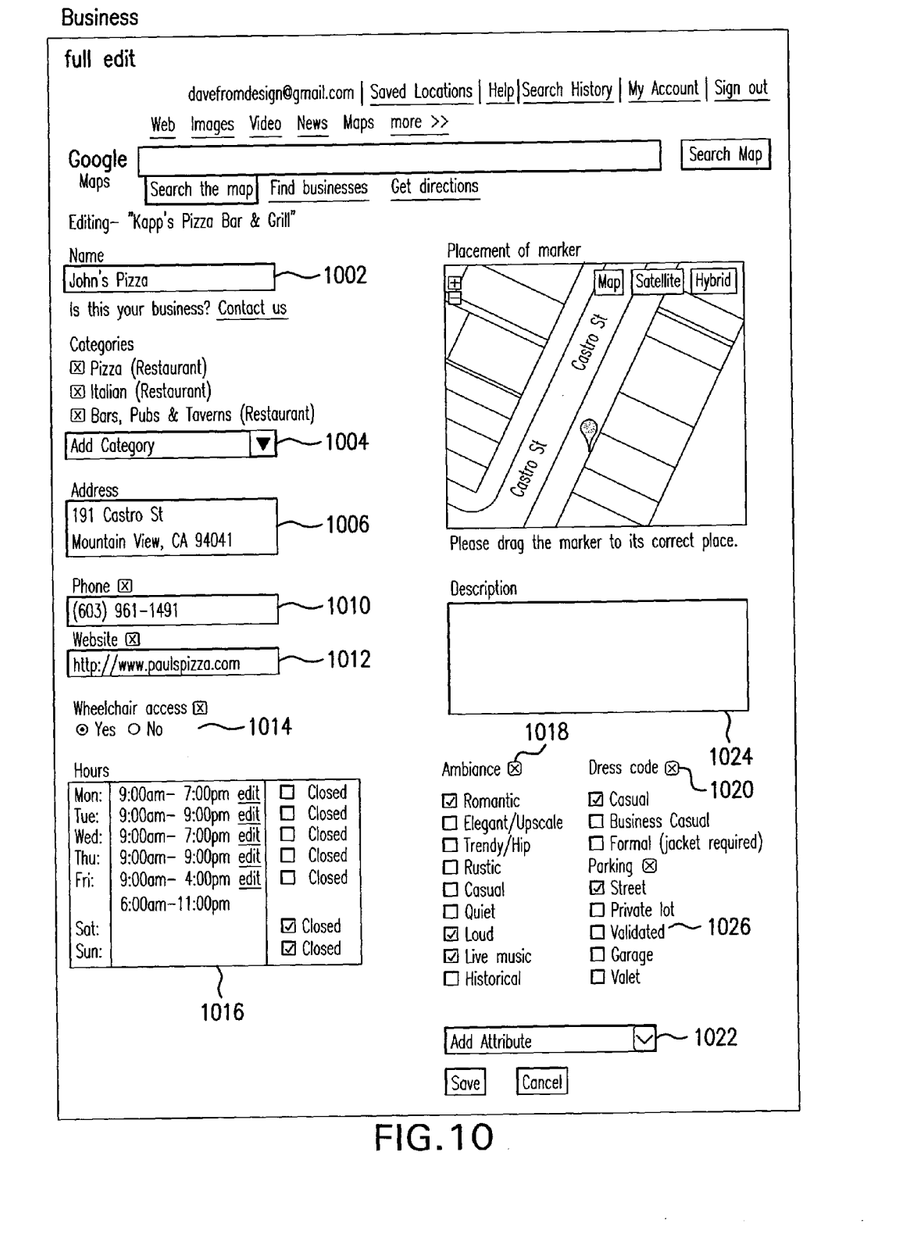

FIG. 10 shows a full edit interface 1000 for a point of interest feature. Full edit interface 1000 includes various inputs. A text field 1002 changes the name of the feature. A text field 1024 adds a description. A drop down menu 1024 adds a category. A text field 1006 changes the address of the feature. A text field 1010 modifies a phone number. A text field 1012 modifies the website. A radio button 1014 is used to indicate whether there is wheelchair access. Input box 1016 is used to change operation hours. Checkbox 1018 indicates ambiance of the point of interest. Checkbox 1020 sets the dress code. Checkbox 1026 sets the parking. Drop down menu 1022 adds an attribute.

Figure 11A:
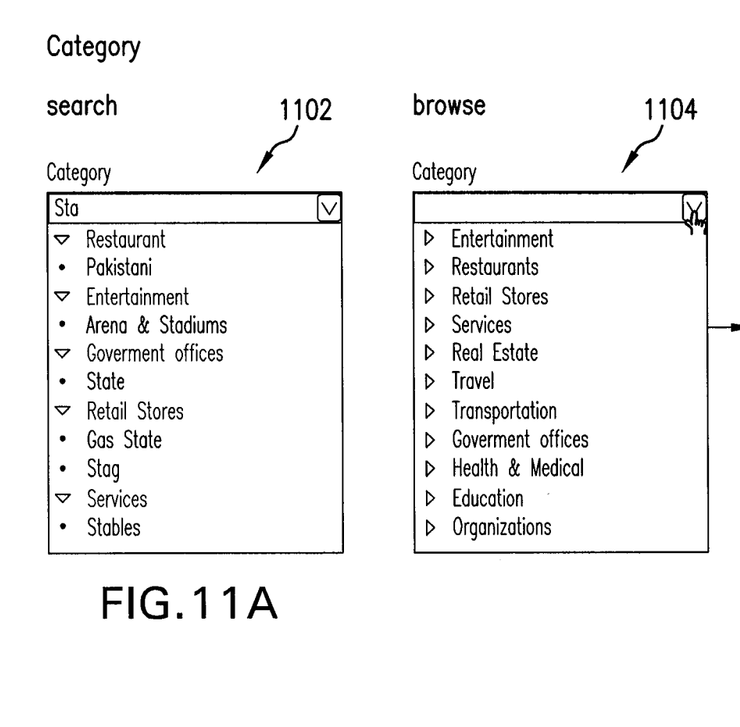
Figure 11B:
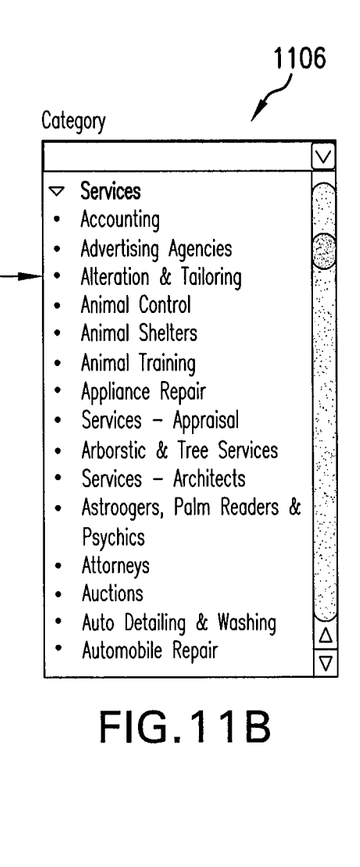

FIGS. 11A-B each show a user interface components for selecting categories. FIG. 11A shows a user interface component 1102. In user interface component 1102, a user can begin typing characters, and the characters being typed initiate a search of the categories. In an example, the search may be a regular expression search. In other examples, the search may be a substring search or a word prefix search. FIG. 11B shows a user interface component 1104. With user interface component 1104, the user may browse categories. Selecting a category may result in expanding a list of sub-categories for the user to select as shown in a user interface component 106.

Figure 12:
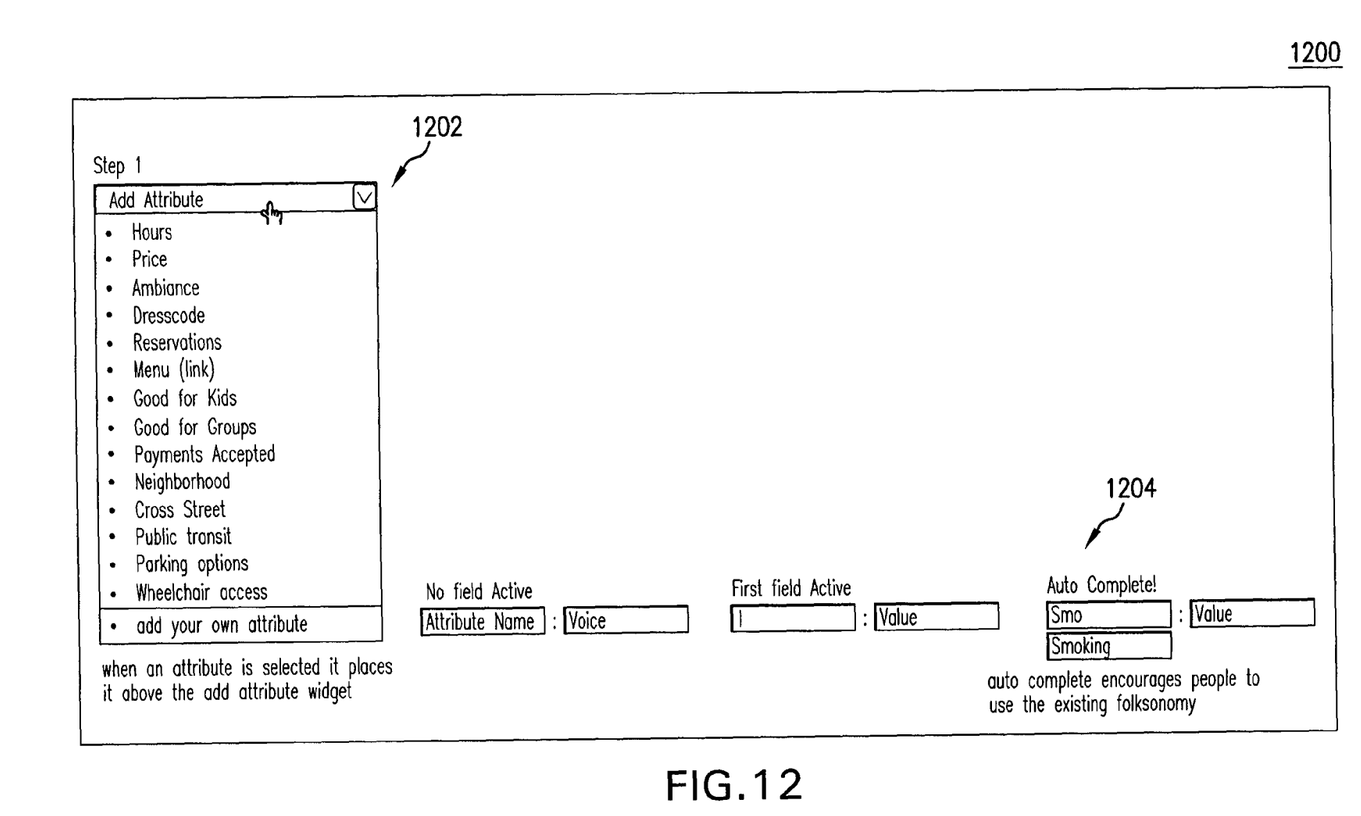

FIG. 12 shows a user interface component 1200 for adding an attribute. An attribute includes an attribute name and value. At 1202, the attribute name may be selected from a drop down menu. Alternatively, the user may enter an attribute name not in the drop down menu. However, to encourage the user to use the use existing taxonomy, as a user types, there is an autocomplete feature as shown at 1204.

It is to be appreciated that the Detailed Description section, and not the Summary and Abstract sections herein, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for providing editable maps, comprising:
   an edit layer dataset that includes geocoded data, at least a portion of the edit layer dataset edited by a user;
   a base layer dataset that includes trusted geocoded data;
   a moderation module configured to be coupled to a processor that receives a change in the edit layer dataset, determines whether the change is reliable, and promotes the change in the edit layer dataset to the base layer dataset after determining that the change has not been modified by another user for a period of time;
   a mapping service module configured to display geocoded data obtained from the edit layer dataset differently than geocoded data obtained from the base layer dataset, wherein differences in the displayed geocoded data indicate differences in assessed reliability of the geocoded data;
   a trust manager module configured to determine a trust metric for the user indicating the user's trustworthiness, wherein the moderation module enables a user to determine whether the change is reliable only if the trust metric of the user exceeds a threshold;
   at least one memory unit configured to store at least one of the moderation module, the mapping service module, or the trust manager module; and
   at least one computer processor configured to execute at least one of the moderation module, the mapping service module, or the trust manager module.

2. The system of claim 1, wherein the moderation module enables a user to determine whether the change is reliable.

3. The system of claim 1, further comprising:
   a mapping service module that enables a user to input the change to the edit layer database.

4. The system of claim 3, wherein the mapping service module provides a simple edit interface and a detailed edit interface that each enable a user to make the change, wherein the detailed edit interface provides more options than the simple edit interface.

5. The system of claim 3, wherein the mapping service module enables a user to report abuse.

6. The system of claim 1, wherein the mapping service module has a browse mode that enables a user to browse geocoded data on a map and a search mode that enables a user to search for geocoded data.

7. The system of claim 1, wherein the change to the edit layer dataset is a move, add, edit, or delete of a geocoded feature.

8. A computer-implemented method for providing editable maps, comprising:
   (a) receiving, by at least one computer processor, a change to geocoded data in an edit layer dataset;

(b) determining, by at least one computer processor, whether the change is reliable;
(c) promoting, by at least one computer processor, the change to a base layer dataset after determining that the change has not been modified by another user for a period of time, wherein the base layer dataset stores trusted geocoded data;
(d) displaying, by at least one computer processor, geocoded data obtained from the edit layer dataset differently than geocoded data obtained from the base layer dataset, wherein differences in the displayed geocoded data indicate differences in assessed reliability of the geocoded data; and
(e) determining, by at least one computer processor, a trust metric for a user indicating the user's trustworthiness, wherein the determining (b) comprises determine whether the change by the user is reliable based on the trust metric.

9. The method of claim 8, wherein the determining (b) comprises enabling a user to determine whether the change is reliable.

10. The method of claim 8, further comprising:
(d) enabling a user to make the change to the edit layer database.

11. The method of claim 10, wherein the enabling (d) comprises
(i) providing a simple edit interface that each enables a user to make the change; and
(ii) providing a detailed edit interface, wherein the detailed edit interface provides more options than the simple edit interface.

12. The method of claim 10, further comprising:
(e) enabling a user to report abuse.

13. The method of claim 8, further comprising:
(d) enabling a user to browse geocoded data on a map; and
(e) enabling a user to search for geocoded data.

14. The method of claim 8, wherein the change to the edit layer dataset is a move, add, edit, or delete of a geocoded feature.

15. An apparatus comprising a non-transitory computer readable medium encoding instructions thereon that, in response to execution by a computing device cause the computing device to perform operations comprising:
(a) receiving a change to geocoded data in an edit layer dataset;
(b) determining whether the change is reliable;
(c) promoting the change to a base layer dataset after determining that the change has not been modified by another user for a period of time, wherein the base layer dataset stores trusted geocoded data;
(d) displaying geocoded data obtained from the edit layer dataset differently than geocoded data obtained from the base layer dataset, wherein differences in the displayed geocoded data indicate differences in assessed reliability of the geocoded data; and
(e) determining a trust metric for a user indicating the user's trustworthiness, wherein the determining (b) comprises determine whether the change by the user is reliable based on the trust metric.

\* \* \* \* \*